(12) United States Patent
Lipson et al.

(10) Patent No.: US 10,746,935 B2
(45) Date of Patent: Aug. 18, 2020

(54) FIBER-TO-WAVEGUIDE COUPLING WITH HIGH ALIGNMENT TOLERANCE

(71) Applicant: The Trustees of Columbia University in the City of New York, New York, NY (US)

(72) Inventors: Michal Lipson, New York, NY (US); You-Chia Chang, New York, NY (US); Oscar Adrian Jimenez Gordillo, New York, NY (US); Mohammad Amin Tadayon, New York, NY (US); Brian Stern, New York, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 0 days.

(21) Appl. No.: 15/883,367

(22) Filed: Jan. 30, 2018

(65) Prior Publication Data

US 2020/0225413 A1 Jul. 16, 2020

Related U.S. Application Data (60) Provisional application No. 62/452,161, filed on Jan. 30, 2017, provisional application No. 62/472,681, filed on Mar. 17, 2017.

(51) Int. Cl.
*G02B 6/122* (2006.01)
*G02B 6/30* (2006.01)

(52) U.S. Cl.
CPC .......... *G02B 6/305* (2013.01); *G02B 6/1228* (2013.01)

(58) Field of Classification Search
USPC .................................................... 385/14, 43
See application file for complete search history.

(56) References Cited

U.S. PATENT DOCUMENTS

| 6,516,131 | B1* | 2/2003 | Tullis | G02B 6/3636 385/137 |
| 9,195,005 | B2 | 11/2015 | Subbaraman et al. | |
| 9,229,169 | B2 | 1/2016 | Doany et al. | |
| 2002/0191916 | A1* | 12/2002 | Frish | G02B 6/1228 385/43 |
| 2015/0023631 | A1* | 1/2015 | Shastri | B32B 37/16 385/14 |
| 2016/0202423 | A1 | 7/2016 | Li et al. | |
| 2016/0327748 | A1 | 11/2016 | Stern et al. | |
| 2017/0059780 | A1 | 3/2017 | Budd | |
| 2017/0059793 | A1 | 3/2017 | Lemaitre et al. | |

(Continued)

FOREIGN PATENT DOCUMENTS

WO WO 2015/120260 A1 8/2015

OTHER PUBLICATIONS

Barry et al., "Efficient optical fiber-to-waveguide coupling suitable for passive alignment", Electronic Components and Technology Conference, Jun. 1993, 1139-1142.

(Continued)

*Primary Examiner* — Eric Wong
(74) *Attorney, Agent, or Firm* — BakerHostetler (57) ABSTRACT

An optical coupling apparatus comprising a substrate having a trench formed therein, the trench having a width measured between two opposing walls that define a portion of the trench; and a waveguide disposed on or in the substrate, the waveguide having a width that tapers along an axis of light propagation.

9 Claims, 9 Drawing Sheets

(56) References Cited

U.S. PATENT DOCUMENTS

2017/0068049 A1    3/2017  Dangel et al.
2017/0205583 A1*  7/2017  Bennett .................... G02B 6/30
2017/0343734 A1* 11/2017  Collins ................. G02B 6/305
2019/0086614 A1*  3/2019  Wang .................... G02B 6/305

OTHER PUBLICATIONS

Gaeta, "E2CDA: Type I: Collaborative Research: Energy Efficient Computing with Chip-Based Photonics", NSF Grant # 1640108, 2 pages.

Lee et al., "Design for high efficiency fiber/waveguide power coupler with SU8 polymer", IERI Procedia, Dec. 2013, vol. 4, Issue 1, 282-287.

Lee et al., "Enhancing alignment tolerance of silicon waveguide by using a wide grating coupler", Optics Express, Aug. 2008, vol. 16, Issue 17, 13024-13031.

Liu et al., "Refractive index engineering of high performance coupler for compact photonic integrated circuits", Japanese Journal of Applied Physics, Feb. 2017, vol. 56, Issue 1, Article No. 04CA01, 10 pages.

Pan et al., "Quasi-vertical tapers for polymer-waveguide-based interboard optical interconnects", Photonics Research, Dec. 2015, vol. 3, Issue 6, 317-323.

Rashidi et al., "Fiber to polymer-waveguide coupling with low insertion loss", Journal of Optics, Feb. 2015, vol. 17, Issue 4, Article No. 045801, 5 pages.

Rickman, "The commercialization of silicon photonics", Nature Photonics, Jul. 2014, 8(8), 579-582.

Sanghadasa et al., "A simplified technique for efficient fiber-polymer-waveguide power coupling using a customized cladding with tunable index of refraction", Journal of Lightwave Technology, Oct. 2006, vol. 24, Issue 10, 3816-3823.

Thomson et al., "Roadmap on silicon photonics", J. Opt., Jun. 2016, 18(7), 073003, 20 pages.

* cited by examiner

FIBER-TO-WAVEGUIDE COUPLING WITH HIGH ALIGNMENT TOLERANCE

CROSS-REFERENCE TO RELATED APPLICATIONS

This application claims priority to and the benefit of U.S. Patent Application Ser. No. 62/452,161, filed Jan. 30, 2017 and U.S. Patent Application Ser. No. 62/472,681, filed Mar. 17, 2017, which are incorporated herein by reference in their entirety.

GOVERNMENT RIGHTS

This invention was made with government support under Grant No. FA8650-15-2-5220 awarded by USAF/ESF and Grant/Contract No. RFSUNY-CU16-1029 awarded by AIM Photonics. The government has certain rights in the invention.

TECHNICAL FIELD

The invention relates to optical coupling and more particularly to a fiber-to-waveguide coupling system.

BACKGROUND

Integrated optical devices (e.g., photonic integrated circuits) are well suited to applications in various technologies such as telecommunications, instrumentation, signal processing and sensors. In operation, photonic integrated circuits use optical waveguides to implement devices, such as optical switches, optical couplers and wavelength multiplexers/demultiplexers, for example. Such waveguides, when integrated with a photonic integrated circuit, are typically implemented as solid dielectric light conductors, which are fabricated on a substrate in a very similar fashion as semiconductor integrated circuits are manufactured. Waveguides transmit light around optical circuits and also connect to external optical waveguides, such as optical fibers, typically by direct physical abutment of the fiber with the waveguide. However, in such a configuration, a mode mismatch results between the integrated waveguide and the optical fiber.

As such, improvements are needed.

SUMMARY

The disclosed systems and methods provide techniques for efficient coupling of light between an optical fiber and an integrated photonic waveguide. In certain embodiments, the systems and methods use a passive alignment technique. Certain technologies for the mass production and commercialization of silicon photonic devices have been limited to coupling of light in and out of the photonic integrated circuits (PIC's). For example, grating couplers and butt coupling technologies can require active alignment, which is can be a challenge for packaging.

In certain embodiments, the disclosed techniques provide for passive alignment and robust packaging of mass PIC's. For example, a D-shape optical fiber can be placed directly on top of a high index contrast rectangular waveguide and they can be evanescently coupled with each other. By slowly tapering up the width of the waveguide along the light propagation direction, the effective refractive index of the waveguide can increases from a value lower than the effective index of the optical fiber to a value higher than it. The disclosed techniques provide for a slow adiabatic transition of the super-mode formed by the coupled waveguide and fiber which can results in the energy transfer from the fiber to the waveguide, as well as high tolerance z-axis and x-axis misalignment.

One constraint for the mass production and commercialization of silicon photonic devices is the coupling of light in and out of the photonic integrated circuits (PIC's). The current technology is mainly based on grating couplers and butt coupling, which requires active alignment to reduce the loss of efficiency due to misalignment. Active alignment involves optimizing the alignment while measuring the light coupling at the same time, posing a great challenge to packaging. Passive alignment allows for a simple pick and place approach with no need of a feedback loop with feedback from an optical output signal to optimize the alignment.

The present disclosure provides a fiber to waveguide coupling approach that could be a feasible solution for the passive alignment and robust packaging of mass produced PIC's. Because of the high efficiency of the coupling, it may alternatively also be used with active alignment.

In an embodiment, an optical coupling apparatus may comprise: (a) a substrate having a trench formed therein, the trench having a width measured between two opposing walls that define a portion of the trench: and (b) a waveguide disposed on or in the substrate, the waveguide having a width that tapers along an axis of light propagation; wherein a width of the trench is configured to receive an optical fiber such that the optical fiber is disposed adjacent the waveguide to allow light to pass from the optical fiber to the waveguide.

In an embodiments, an optical coupling apparatus may comprise: (a) a substrate; (b) a polymer bridge disposed adjacent the substrate, wherein the polymer bridge comprises a ramped portion having a thickness in a first dimension that increases along a second dimension orthogonal to the first dimension; and (c) an optical fiber disposed adjacent the ramped portion of the polymer bridge, the optical fiber having a tapered diameter that decreases in diameter along a direction of light propagation, wherein the substrate has a lower index of refraction than an index of refraction of the optical fiber.

The scope of the invention also includes a system including a processor that executes stored instructions for executing the steps of the method. The above and other characteristic features of the invention will be apparent from the following detailed description of the invention.

BRIEF DESCRIPTION OF THE DRAWINGS

The present application is further understood when read in conjunction with the appended drawings. In the drawings:

FIGS. 2A-2D illustrate how the light is transferred and evolves along the coupler system.

DETAILED DESCRIPTION OF ILLUSTRATIVE EMBODIMENTS

Certain constraint for the mass production and commercialization of silicon photonic devices is the coupling of light in and out of the photonic integrated circuits (PIC's). Certain technology is based on grating couplers and butt coupling, which requires active alignment to reduce the loss of efficiency due to misalignment. Active alignment can involve optimizing the alignment while measuring the light coupling at the same time, posing a great challenge to packaging. Passive alignment can be used for a simple pick and place approach with no need of a feedback loop to optimize the alignment.

The disclosed techniques provide for the passive alignment and robust packaging of mass produced PIC's.

It is understood that index values are wavelength dependent, the indexes referenced herein are relevant for wavelengths in the near infrared spectral range, which is the one used in the optical communications industry, but the same index constraints apply for any wavelength range of interest.

In accordance with the present disclosure, a D-shape optical fiber can be placed directly on top of a high index contrast rectangular waveguide (See FIG. 1) and they can be evanescently coupled with each other. The effective refractive index of the waveguide can increases from a value lower than the effective index of the optical fiber to a value higher than it by tapering up the width of the waveguide along the light propagation direction. (See FIG. 2d) The present disclosure provides a slow adiabatic transition of the supermode formed by the coupled waveguide and fiber, and can results in the energy transfer from the fiber to the waveguide. The disclosed method provides very high tolerance z-axis misalignment. In accordance with the disclosed method, a structure can be fabricated to reduce the x-axis misalignment by etching a trench with a width of the fiber's diameter size along the coupling region of the waveguide on the chip.

Figure 1:
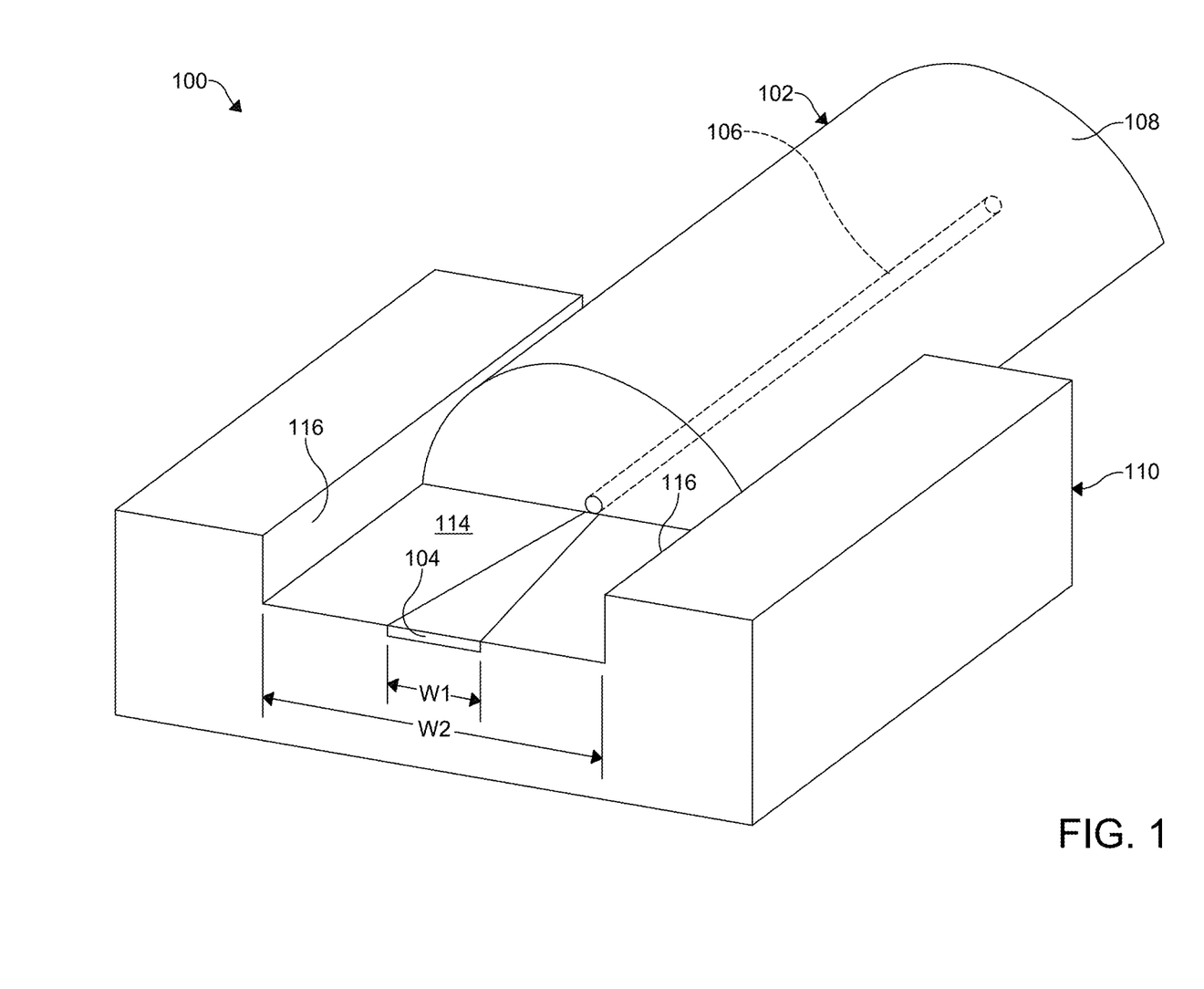
FIG. 1 illustrates a schematic representation of a coupling system, where a D-shape fiber is placed on top of the tapered waveguide. The x-axis alignment is set by the etched trench which is designed to fit exactly the D-shape fiber.

FIG. 1 illustrates a coupling system 100 comprising an optical fiber 102 and a waveguide 104. The optical fiber 102 may have a generally D-shaped cross-section. The optical fiber 102 may comprise a fiber core 106 configured to transmit light. A cladding 108 may be disposed adjacent the fiber core 106. The cladding 108 may be disposed to surround at least a portion of the fiber core 106. The cladding 108 may be configured with a lower refractive index than the fiber core 106 to cause light to be confined within the fiber core, as is understood to one of skill in the art. The cladding 108 may be or comprise silicon dioxide (e.g., the index varies minimally around 1.44 depending on the manufacturer). The fiber core 106 may be or comprise doped silicon dioxide with refractive indexes larger than the cladding 108. In certain aspects, the index of the fiber core 106 is larger than the index of a dielectric substrate (e.g., substrate 110). In certain aspects, high index fibers may be used (with core index around 1.48).

Figure 2A:
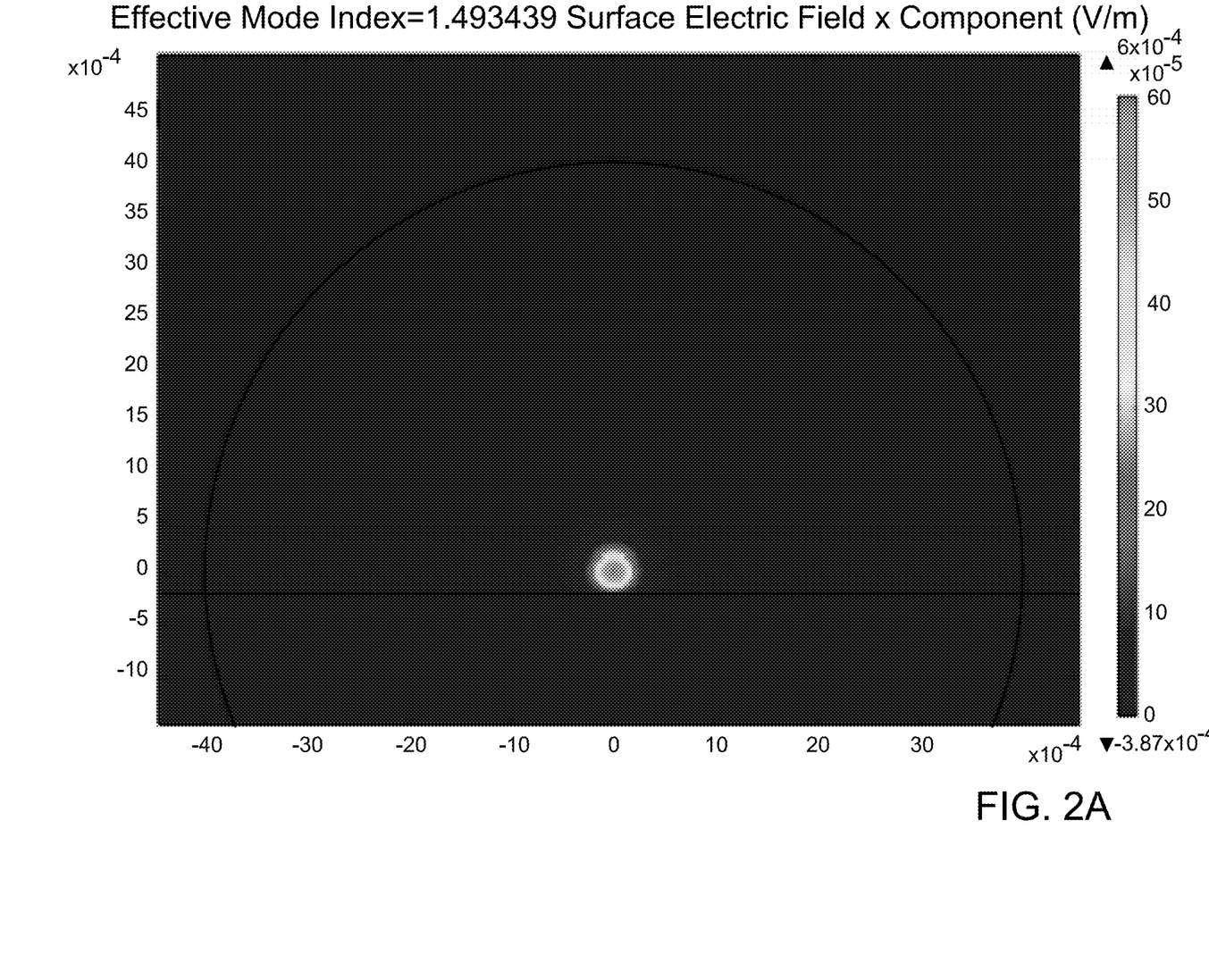
FIG. 2A shows the light is mostly contained in the fiber's core for regions where the waveguide effective index is lower than that of the fiber effective index.
Figure 2B:
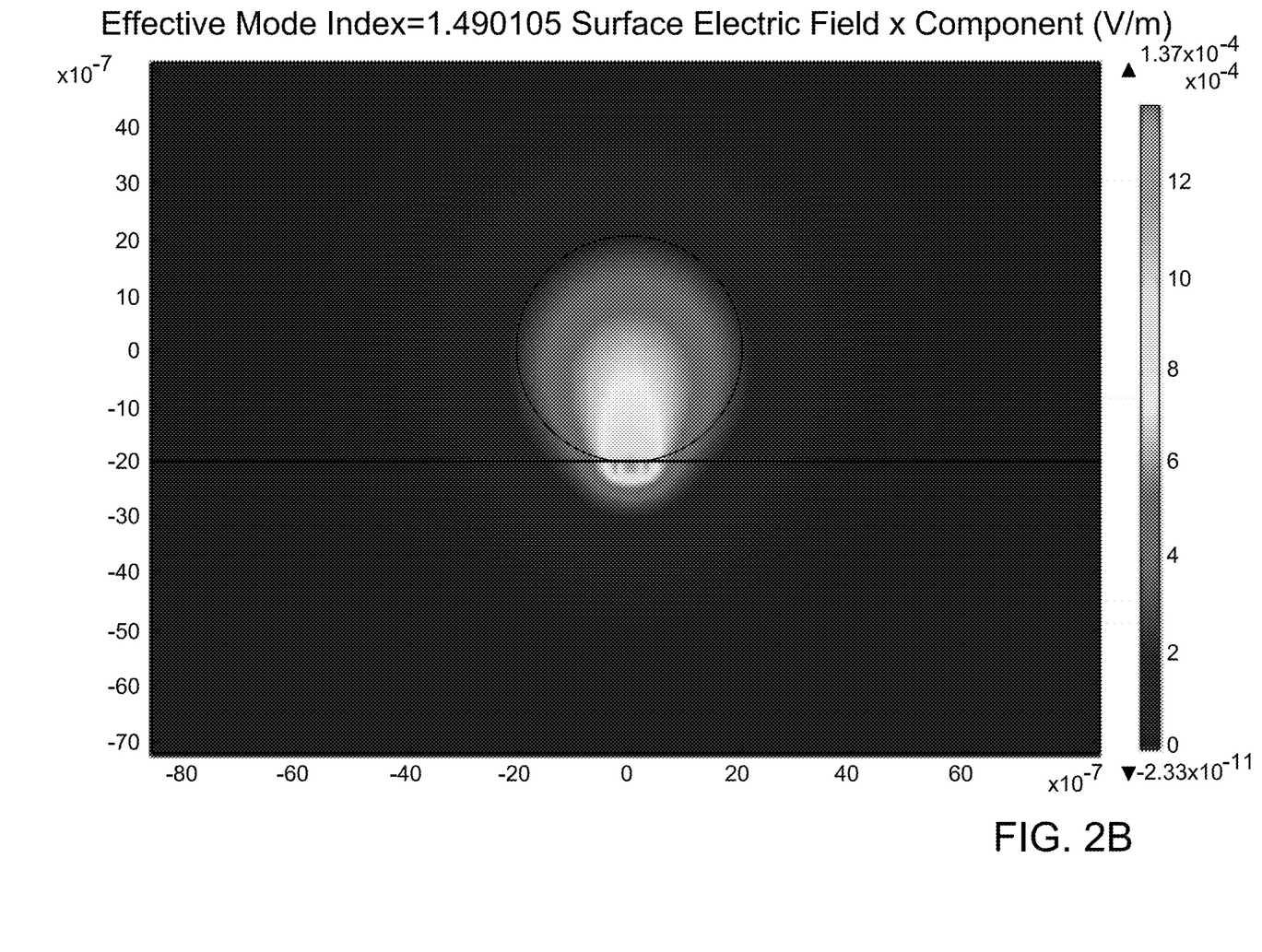
FIG. 2B shows how the light is distributed in the region where the two effective indexes match and the light is transferred from one structure to the other.
Figure 2C:
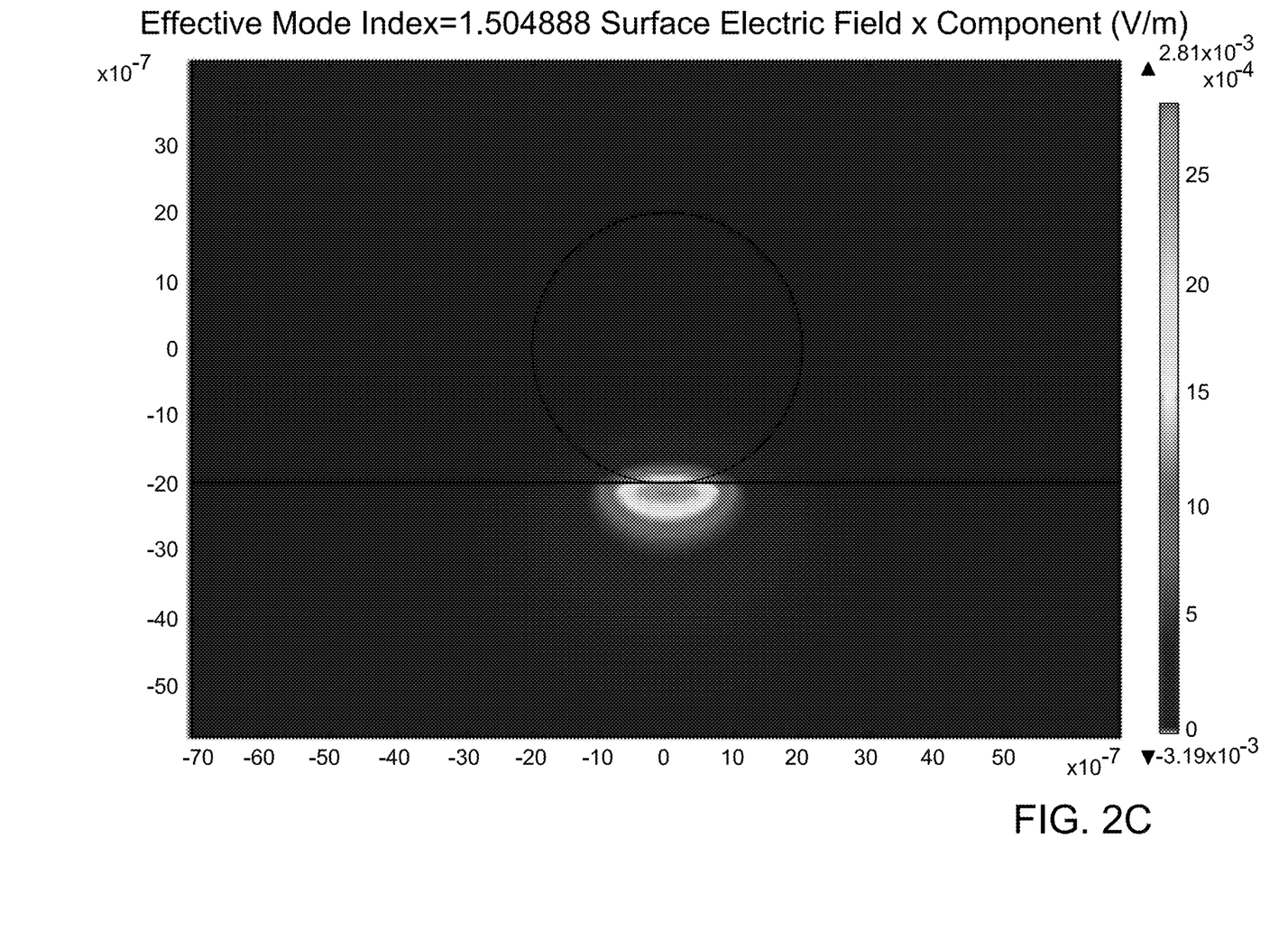
FIG. 2C shows the light contained in the waveguide in the regions where the waveguide effective index is higher than that of the fiber effective index. Here the light is contained mostly in the waveguide.
Figure 2D:
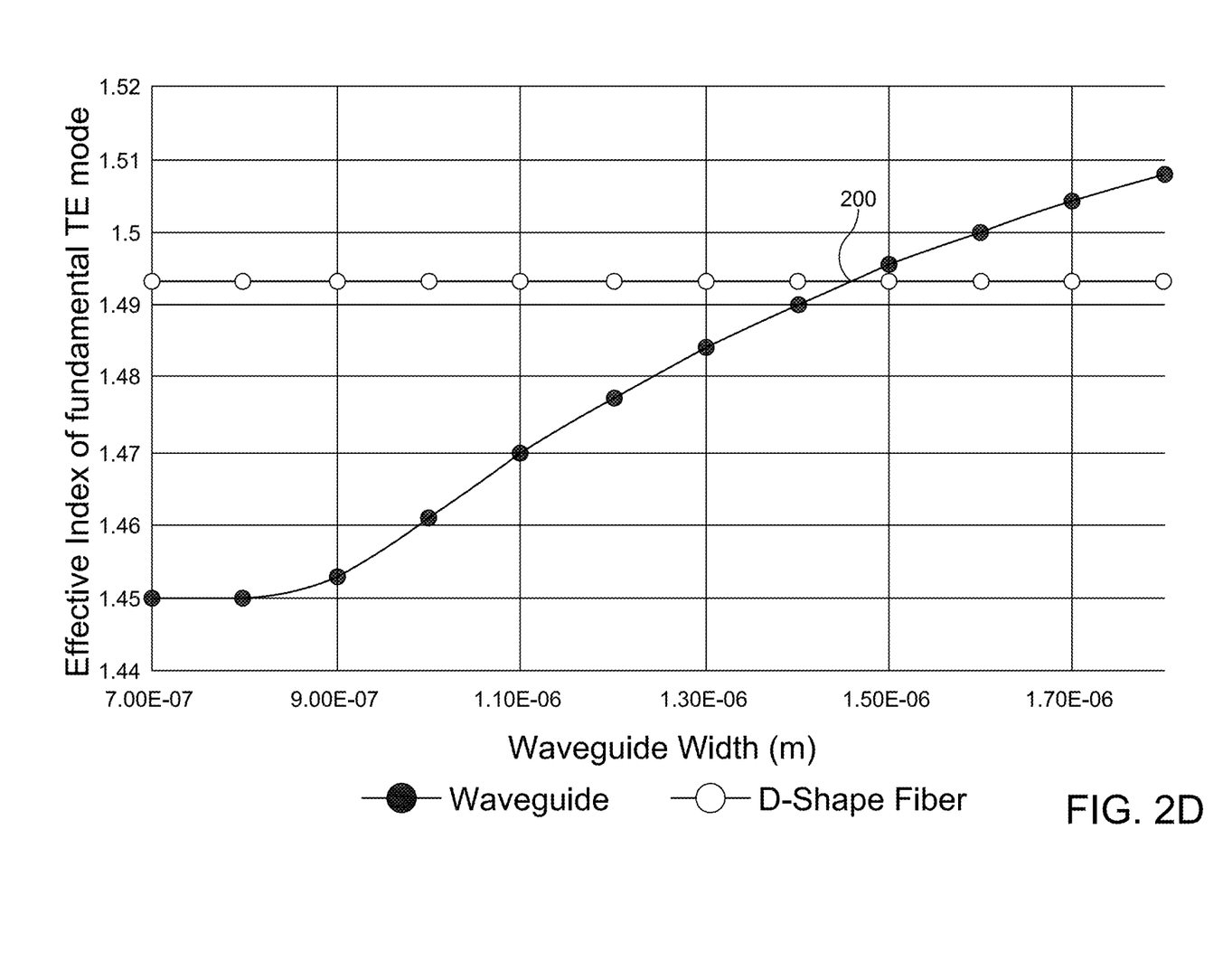
FIG. 2D shows how the effective refractive index of the waveguide (in blue) increases as the waveguide width becomes larger. Orange line shows the effective index of the light in the fiber core. The crossing point is where the light is transferred from one structure to the other as shown in FIG. 2B.
Figure 3:
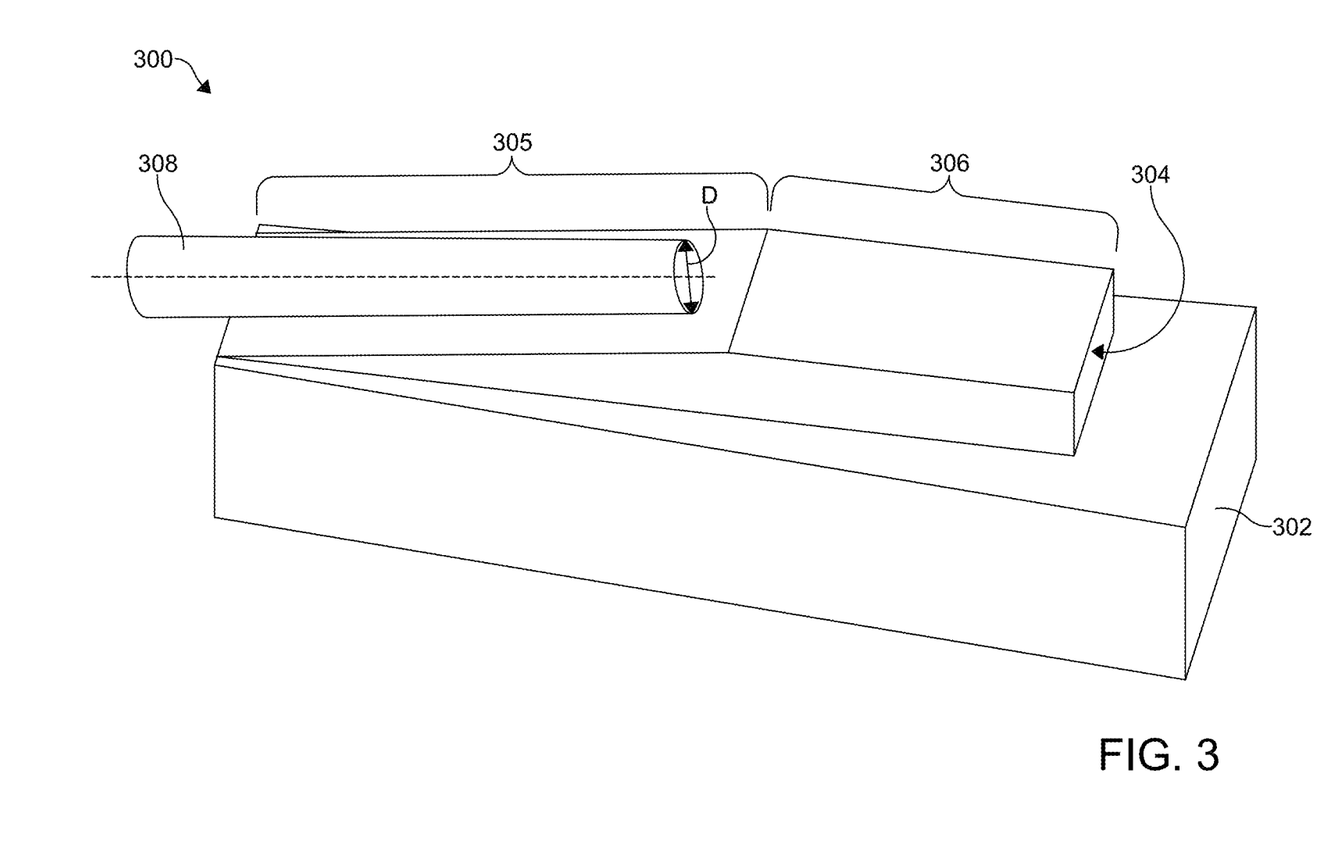
FIG. 3 illustrates a schematic representation of a coupling system.

The waveguide 104 may be disposed in or on a substrate 110. The substrate 110 may be formed from or may comprise a dielectric material. The waveguide 104 may have a generally fixed thickness in a first dimension and an expanding width in a second dimension orthogonal to the first dimension. The width (W1) of the waveguide 104 may expand along the direction of light propagation. As such, an effective index of the waveguide 104 may transition from an index lower than that of the optical fiber 102 to a crossover point (e.g., crossover point 200 (FIG. 2d)) and then to an effective index that is higher than the optical fiber 102, as illustrated in FIG. 2d. Light may be transferred from the optical fiber 102 to the waveguide 104 at the crossover point.

The substrate 110 may be formed from or may comprise silicon dioxide (e.g., having an index of 1.44). A trench 112 may be formed in the substrate 110. As shown, the waveguide 104 may be disposed on or adjacent a floor 114 of the trench 112. A width (W2) of the trench 112, as measured between wall 116 defining a portion of the trench 112 may be sized based on a width of the optical fiber 102. The width of the trench 112 may be the same or within operational tolerance of a width of the optical fiber 102 so as to receive at least a portion of the optical fiber 102 within the trench 112.

In reference to FIGS. 3-6, a coupling system 300 may comprise a substrate 302, a polymer bridge 304 (e.g., waveguide) disposed adjacent the substrate 302, and an optical fiber 308 disposed adjacent the polymer bridge 304. The substrate 302 may be transparent or substantially transparent. In certain aspects, the substrate 302 may be formed from or comprise a material that has refractive index lower than the effective refractive index of the optical fiber 308 (e.g., may be lower than 1.4; may be or comprise magnesium fluoride with refractive index around 1.37).

The polymer bridge 304 may comprise a ramped portion 305 having a thickness in a first dimension that increases along a second dimension orthogonal to the first dimension. The polymer bridge 304 may comprise a flat or unramped portion 306. The polymer bridge may be formed from or may comprise a microfabrication compatible polymer with low absorption of light in the wavelength range of interest. Its effective index may be higher than the optical fiber 308 (e.g., 1.44) and lower than a photonic integrated waveguide described in detail below (e.g., having an index of 2 in the case of silicon nitride waveguides and 3.5 in the case of silicon waveguides). As an example, the polymer bridge 304 may be formed from or may comprise SU-8, IP-S and IP-DIP photoresists with refractive indexes ranged from 1.5 to 1.6.

The ramped portion 305 of the polymer bridge 304 may be formed using various techniques. As a non-limiting example, the vertically tapered polymer bridge 304 may be fabricated using sub-micrometer resolution 3D printing based on two-photon polymerization of a polymer. The uncured polymer may be drop casted on the low index substrate 302 and loaded in the 3D printer (e.g., using Nanoscribe's Photonic Professional GT printer). After printing, the sample may be developed (e.g., the uncured polymer is dissolved) resulting in the polymer bridge 304. As a further non-limiting example, a modified photolithography process may be used to form at least a portion of the polymer bridge 304. In particular, a mask may be tilted with respect to the substrate 302 using spacers of a desired height. The polymer is introduced and fills a gap formed between the mask and the substrate 302 by capillarity. After exposing the sample using a mask aligner, the sample may be developed resulting in the polymer bridge 304.

The optical fiber 308 may be disposed adjacent the ramped portion 305 of the polymer bridge 304. The substrate 302 may have a lower index of refraction than an index of refraction of the optical fiber 308. An effective refractive index of the optical fiber 308 may be larger than the low index substrate 302 and lower than the polymer bridge 304. The optical fiber 308 may have a tapered diameter (D) that decreases in diameter along a direction of light propagation. As an example, a standard commercial single mode fiber may be configured to reduce its diameter in a tapered fashion. As a further example, the optical fiber 308 may be formed from or is a silicon dioxide cladding with a doped silicon dioxide core with a higher index than the cladding. Both are originally around 1.44 but after tapering the effective refractive index can go as low as 1.4.

Figure 4:
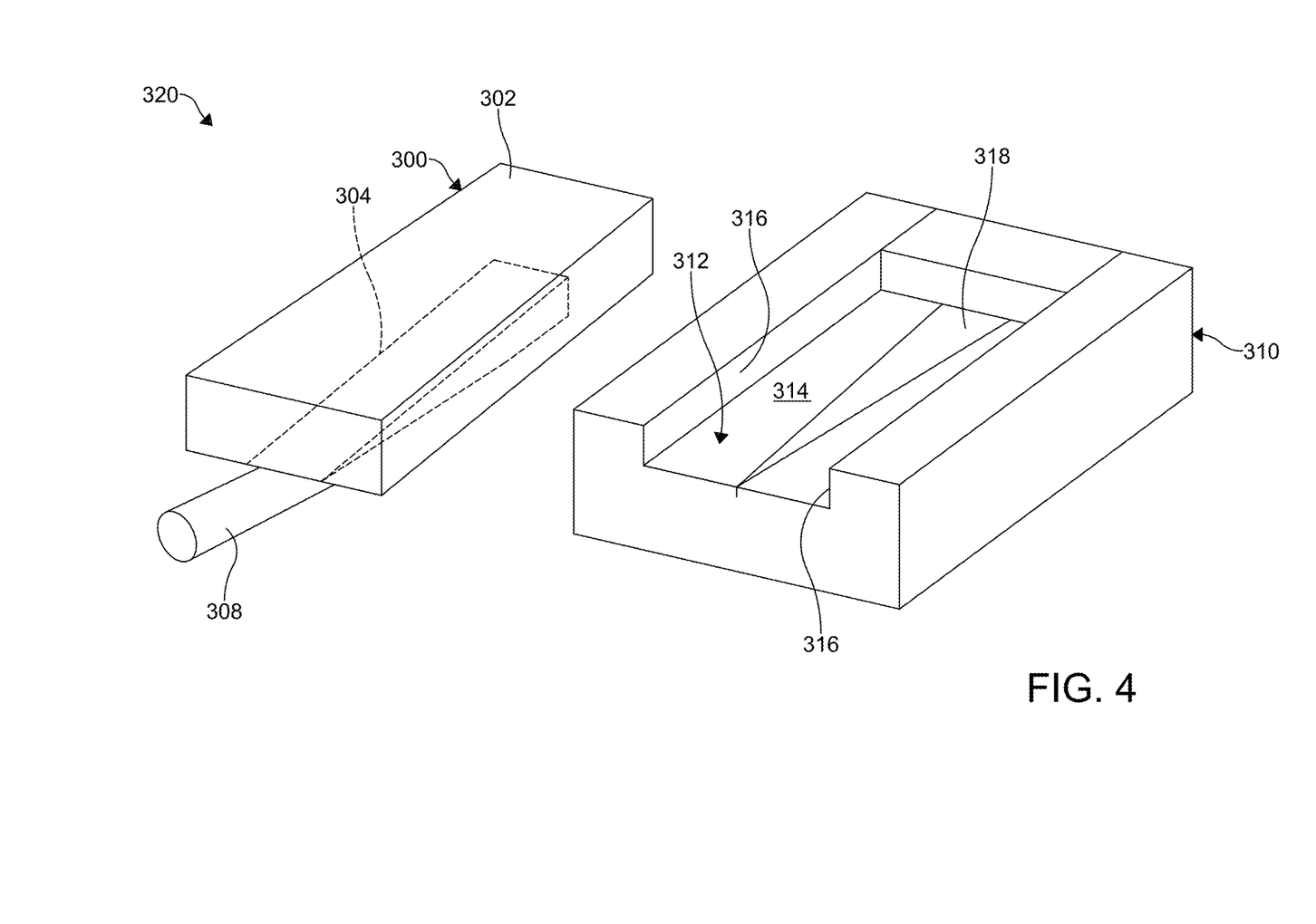
FIG. 4 illustrates a partial explode view of a schematic representation of a coupling system.
Figure 5:
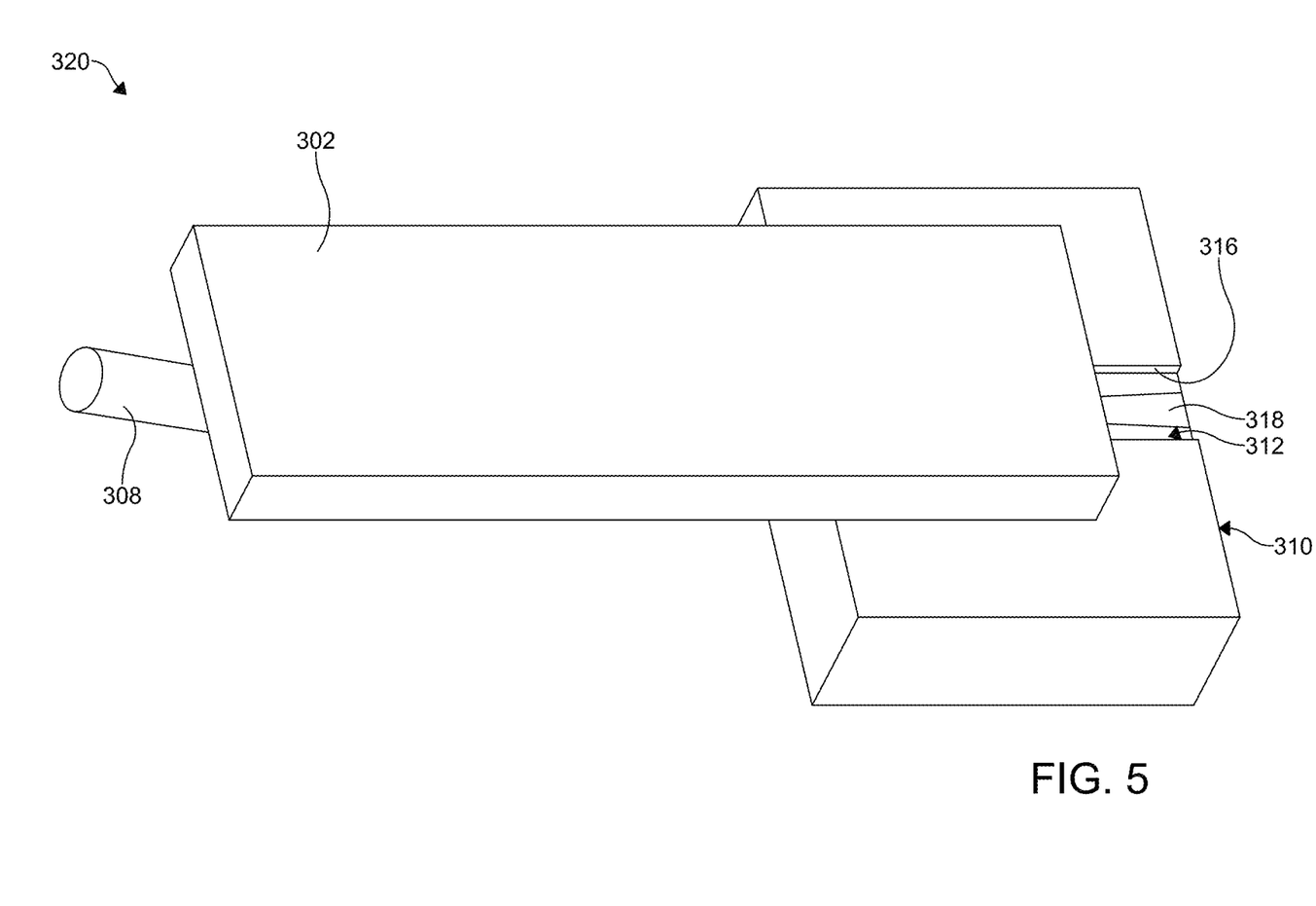
FIG. 5 illustrates a perspective view of the coupling system of FIG. 4 disposed in a coupled configuration.
Figure 6:
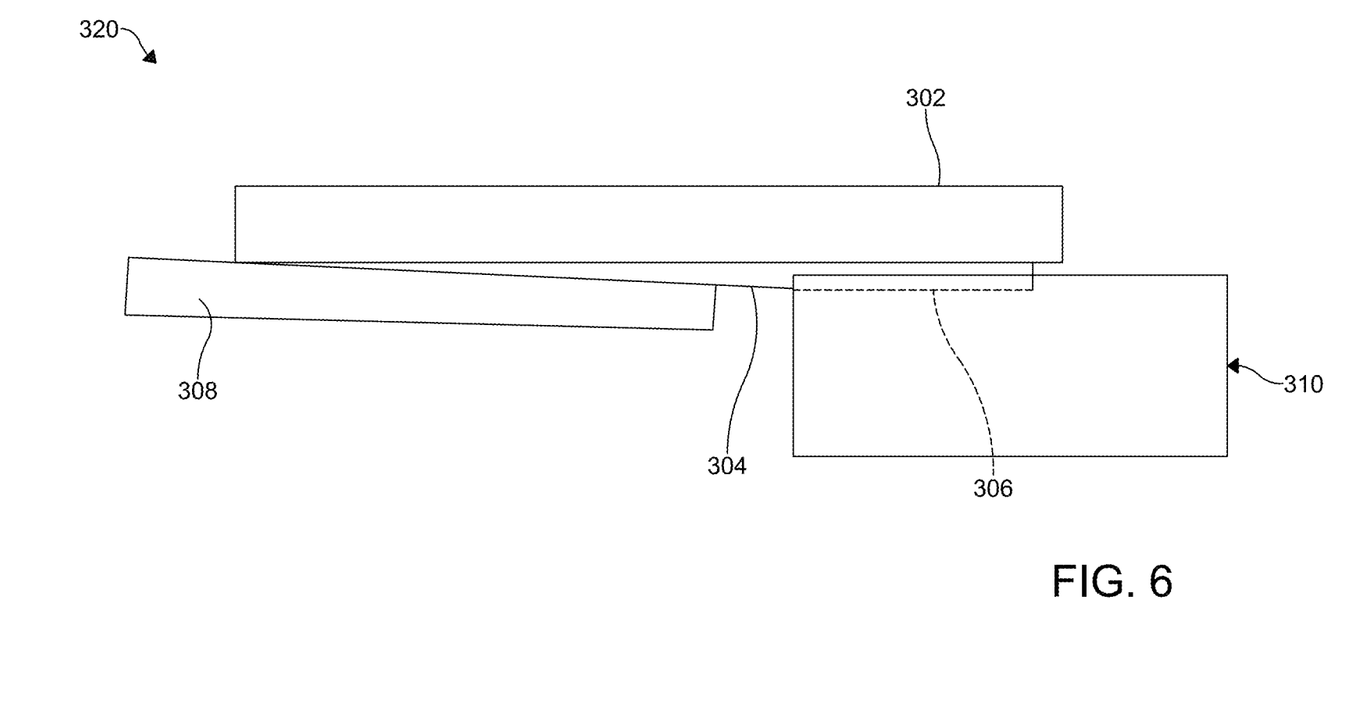
FIG. 6 illustrates a side elevation view of the coupling system of FIG. 5 disposed in a coupled configuration.

In reference to FIGS. 4-6 a coupling system 320 may comprise the coupling system 300 configured to interface with other apparatuses or components such as a waveguide substrate 310 and a waveguide 318. The waveguide 318 may be disposed in or on a substrate 310. The substrate 310 may be formed from or may comprise a dielectric material. The waveguide 318 may have a generally fixed thickness in a first dimension and an expanding width in a second dimension orthogonal to the first dimension. The width of the waveguide 318 may expand along the direction of light propagation. As such, an effective index of the waveguide 318 may transition from an index lower than that of the polymer bridge 304 to a crossover point and then to an effective index that is higher than the polymer bridge 304. Light may be transferred from the optical fiber 308 to the polymer bridge 304 and from the polymer bridge 304 to the waveguide 318.

The substrate 310 may be formed from or may comprise silicon dioxide (e.g., having an index of 1.44). A trench 312 may be formed in the substrate 310. As shown, the waveguide 318 may be disposed on or adjacent a floor 314 of the trench 312. A width of the trench 312, as measured between wall 316 defining a portion of the trench 312 may be sized based on a width of the polymer bridge 304. The width of the trench 312 may be the same or within operational tolerance of a width of the polymer bridge 304 so as to receive at least a portion of the non-ramped part 306 of the polymer bridge 304 within the trench 312. As shown in FIG. 6, when a portion of the polymer bridge 304 is received in the trench 312, the optical fiber 308 may be disposed adjacent the ramped portion 305 of the polymer bridge 304. Light may be transferred from the optical fiber 308 to the polymer bridge 304 and from the polymer bridge 304 to the waveguide 318.

As described here, a vertically tapered polymer bridge (e.g., waveguide; polymer bridge 304) is fabricated on a low index substrate (lower refractive index than optical fiber). This polymer structure serves as a bridge for light transmission between a tapered fiber and the silicon photonics chip. The light transfer between the fiber and polymer and between the polymer and silicon photonics chip is achieved via adiabatic coupling as the evanescent fields of the waveguides are in proximity. This kind of coupling allows for high misalignment tolerances. On the fiber end of the polymer bridge the effective index of the tapered fiber and the effective index of the vertically tapered polymer waveguide cross along the coupling region which allows for light propagation through the polymer waveguide. On the chip end of the polymer bridge the effective index of an inversely tapered silicon nitride or silicon waveguide and the one of the polymer waveguide cross along the coupling region. The effective index of a waveguide varies as the waveguide width varies. The polymer coupling to chip is achieved by etching a trench on the silicon photonics chip cladding to access the silicon nitride or silicon waveguide. This end of the polymer bridge fits inside this trench allowing direct contact between the inverse tapered nitride waveguide and the polymer waveguide. First experimental demonstration of this coupling approach show highly efficient and high tolerance to misalignment characteristics.

Those skilled in the art also will readily appreciate that many additional modifications are possible in the exemplary embodiment without materially departing from the novel teachings and advantages of the invention. Accordingly, any such modifications are intended to be included within the scope of this invention as defined by the following exemplary claims.

What is claimed:

1. An optical coupling apparatus comprising:
   (a) a substrate;
   (b) a polymer bridge disposed adjacent the substrate, wherein the polymer bridge comprises a ramped portion having a thickness in a first dimension that increases along a second dimension orthogonal to the first dimension; and
   (c) an optical fiber disposed adjacent the ramped portion of the polymer bridge, the optical fiber having a tapered diameter that decreases in diameter along a direction of light propagation,
   wherein the substrate has a lower index of refraction than an index of refraction of the optical fiber.

2. The optical coupling apparatus of claim 1, wherein the substrate is transparent or substantially transparent.

3. The optical coupling apparatus of claim 1, further comprising:
   (a) a waveguide substrate having a trench formed therein, the trench having a width measured between two opposing walls that define a portion of the trench; and
   (b) a waveguide disposed on or in the substrate, the waveguide having a width that tapers along an axis of light propagation;
   wherein a width of the trench is configured to receive one or more of the polymer bridge and the optical fiber such that at least a portion of the polymer bridge is disposed adjacent the waveguide to allow light to pass from the optical fiber to the polymer bridge and from the polymer bridge to the waveguide.

4. The optical coupling apparatus of claim 3, wherein the waveguide substrate comprises a dielectric material.

5. The optical coupling apparatus of claim 3, wherein the waveguide is disposed on or in a floor of the trench between the two opposing walls.

6. The optical coupling apparatus of claim 3, wherein the waveguide comprises one or more of silicon and silicon nitride.

7. The optical coupling apparatus of claim 3, wherein the tapering width of the waveguide has a first width exhibiting a first effective index of refraction that is lower than an index of refraction of the portion of the polymer bridge, a second width exhibiting a second effective index of refraction that is substantially the same as the index of refraction of the portion of the polymer bridge, and a third width exhibiting a third effective index of refraction that is higher than the index of refraction of the portion of the polymer bridge.

8. The optical coupling apparatus of claim 1, wherein the polymer bridge is disposed at least partially between the substrate and the optical fiber.

9. The optical coupling apparatus of claim 1, wherein a first end of the optical fiber is optically coupled, via the polymer bridge, to a photonic integrated circuit and a second end of the optical fiber opposite the first end is optically coupled to a component external to the photonic integrated circuit.

\* \* \* \* \*